(12) United States Patent
Owens et al.

(10) Patent No.: US 7,537,181 B2
(45) Date of Patent: May 26, 2009

(54) GUIDANCE SYSTEM

(75) Inventors: Geoffrey L Owens, Filton (GB);
Andrew R Beckett, Filton (GB)

(73) Assignee: MBDA UK Limited, Stevenage,
Hertfordshire (GB)

( * ) Notice: Subject to any disclaimer, the term of this patent is extended or adjusted under 35 U.S.C. 154(b) by 1060 days.

(21) Appl. No.: 10/265,098

(22) Filed: Sep. 25, 2002

(65) Prior Publication Data

US 2008/0012751 A1    Jan. 17, 2008

(30) Foreign Application Priority Data

Sep. 26, 2001 (GB) ................. 0123638.9
Mar. 7, 2002 (GB) ................. 0205397.3

(51) Int. Cl.
*F41G 7/28* (2006.01)
*G01S 13/90* (2006.01)
*G01S 13/86* (2006.01)
*F41G 7/00* (2006.01)
*G01S 13/00* (2006.01)

(52) U.S. Cl. ............ 244/3.14; 244/3.1; 244/3.11; 342/25 R; 342/25 A; 342/25 B; 342/175; 342/195

(58) Field of Classification Search .......... 342/25, 342/27, 28, 60–72, 175, 192, 193–197, 25 R–25 F, 342/118, 119, 125–158; 244/3.1–3.3; 701/1, 701/3–18

See application file for complete search history.

(56) References Cited

U.S. PATENT DOCUMENTS

| 2,950,477 | A | | 8/1960 | Alpers |
| 3,778,007 | A | * | 12/1973 | Kearney et al. ............ 244/3.14 |
| 3,856,237 | A | | 12/1974 | Torian et al. |
| 4,163,231 | A | | 7/1979 | Zuerndorfer et al. |
| 4,204,210 | A | | 5/1980 | Hose |

(Continued)

FOREIGN PATENT DOCUMENTS

DE          34 03 558          8/1985

(Continued)

*Primary Examiner*—Bernarr E Gregory
(74) *Attorney, Agent, or Firm*—Nixon & Vanderhye P.C.

(57) ABSTRACT

There is provided a guidance system for allowing an air vehicle to guide a moving object, comprising a Synthetic Aperture Radar located on the air vehicle, and a means of communication for allowing the air vehicle to communicate with the moving object, wherein the Synthetic Aperture Radar is capable of determining the position and orientation of the air vehicle relative to a desired location, and information provided by the Synthetic Aperture Radar is used, via the means of communication, to guide the moving object towards the desired location. A guidance system wherein a seeker is utilised on the moving object is also provided. The invention further provides a method for allowing an air vehicle to guide a moving object towards a desired location comprising the steps of using a Synthetic Aperture Radar to determine the position and/or orientation of the air vehicle relative to a desired location, establishing a communications link for allowing the air vehicle to communicate with the moving object, using the communications link to provide information to the moving object and thereby to guide the moving object towards the desired location. A method wherein a seeker located on the moving object is utilised is also provided. The invention further provides methods for aligning a radar beam with a target in a Synthetic Aperture Radar image.

12 Claims, 3 Drawing Sheets

U.S. PATENT DOCUMENTS

| | | |
|---|---|---|
| 4,442,431 A | 4/1984 | Bleakney |
| 5,473,331 A | 12/1995 | Kennedy et al. |
| 5,742,250 A | 4/1998 | Krikorian et al. |
| 5,826,819 A * | 10/1998 | Oxford .................. 244/3.14 |
| 5,982,319 A | 11/1999 | Borden et al. |

FOREIGN PATENT DOCUMENTS

| | | |
|---|---|---|
| EP | 0 093 603 A1 | 11/1983 |
| EP | 0 709 691 | 5/1996 |
| GB | 2 279 529 | 1/1995 |
| GB | 2 305 566 | 4/1997 |
| WO | WO 99/00676 A1 | 1/1999 |

\* cited by examiner

GUIDANCE SYSTEM

BACKGROUND OF THE INVENTION

1. Field of the Invention

The present invention relates to the field of guidance systems, and more particularly to all weather air direction systems including all weather air targeting systems.

During the course of military operations it may be necessary to attack targets using air launched weapons against surface targets either on land or sea. Typically a bomb or air to surface missile might be aimed at such targets.

Additionally it may be necessary to direct air, land or sea vehicles remotely. For example a drone aircraft may require directional guidance from a reconnaissance aircraft or other air vehicle. Similarly, a reconnaissance aircraft or other air vehicle may guide a ship or a tank.

In the present context air vehicles may include fixed and rotary wing aircraft and space craft. The term targeting is used here to mean the ability to aim and direct an attack against a chosen location, either stationary or mobile.

When attacking a surface target an adversary is likely to use a wide range of defensive weapons such as Surface to Air Missile Systems, directed energy weapons, guns and gun systems and defending aircraft. In order to protect an aircraft or other launch platform attacking a surface target it is desirable to launch Air to Surface Weapons from as great a distance as possible. Depending upon the relative location of target and defences further benefit may be gained from the ability to attack from a variety of advantageously selected locations.

It is desirable to launch Air to Surface weapons during a wide range of weather conditions but known airborne weapon systems are adversely operationally affected by cloud and rain which obscure the target. Additionally, opposing forces may use artificial means of obscuring targets such as camouflage netting, or screening smoke, or other obscurants inside and beyond the visible band. A technology providing a means for targeting over a wide range of natural and artificially imposed environments is therefore potentially advantageous.

During military operations, destruction of other than an intended target is undesirable. An imprecisely directed and controlled attack is likely to give rise to indiscriminate loss of life of friendly forces, non-combatants, members of the civilian population and result in the loss of non-targeted assets. The ability to undertake air to surface targeting with precision and control is for these reasons desirable.

During air to surface attack further benefit may be obtained from the ability to prevent weapons striking non-targeted locations. For example an air launched weapon which is unlikely to hit its intended target should preferably be prevented from causing collateral damage or fratricide. Further advantage may therefore be gained from an ability to reduce or eliminate fratricide.

Targets for air to surface attack may be dispersed over an area of ground or sea. Examples are railway junctions, military formations of naval or ground forces and dock facilities. Air to surface attack aircraft frequently launch numbers of weapons within a short period of time. It may be undesirable for all of the weapons to strike only a small area within a large target and it is often preferable that the weapons may instead be directed to impact at selected points or areas over the target. For example bombs may preferably be targeted to impact at various points along an aircraft runway rather than within a small area of the runway so that overall damage is maximised. The ability to control impact points of a number of weapons directed at a target is therefore additionally advantageous.

SUMMARY OF THE INVENTION

The present invention seeks to provide an improved guidance system for the direction of air, land or sea vehicles and for the targeting of weaponry, that displays at least some of the following advantages:
    maximising launch range from the target
    the ability to select an advantageous launch position
    improved operation during a wide range of weather conditions
    targeting precision
    control
    reduction or elimination of fratricide
    reduction in collateral damage
    lower weapon costs.

According to the present invention in one embodiment thereof there is provided a guidance system for allowing an air vehicle to guide a moving object, comprising
a Synthetic Aperture Radar located on the air vehicle, and
a means of communication for allowing the air vehicle to communicate with the moving object,
wherein the Synthetic Aperture Radar is capable of determining the position and orientation of the air vehicle relative to a desired location, and information provided by the Synthetic Aperture Radar is used, via the means of communication, to guide the moving object towards the desired location.

The present invention provides a means of accurate targeting for one or more moving objects, such as air to surface munitions or unmanned air vehicles for example, or a means of guidance for surface navigating craft. The present invention might be designed as a retrospective modification or as an additional module to an appropriately configured operational craft. In the targeting applications, the separate tasks of munition launch and munition direction may be combined into one launch and direction platform or these two functions may be realised independently. For example, an aircraft might launch one or more air to surface munitions which might be directed towards a target by a second aircraft. Alternatively a single aircraft might both launch the munitions and provide the means through the present invention of directing them towards the target.

Preferably the Synthetic Aperture Radar determines both the position and orientation of the air vehicle. Alternatively a GPS may be used to determine position of the air vehicle and the Synthetic Aperture Radar may be used to determine orientation of the air vehicle. Information relating to the position and orientation of the air vehicle relative to the desired location is then used to guide the moving object towards the desired location.

A Synthetic Aperture Radar is a means of achieving fine resolution through the use of a moderately small antenna in combination with the motion of the platform on which it is mounted. One function of the Synthetic Aperture Radar in this application is to illuminate the target and surrounding area and to provide geographical co-ordinates or means for obtaining measurements of the target and its surroundings in the form of an approximate plan view so that the target may be located, either by a human operator or by automated means. For this purpose, the target and/or other features on the measured radar image may be compared with data derived from prior information such as maps, optical reconnaissance data or satellite synthetic aperture measurements. Detection and recognition of the target may be based on the shape of the candidate object, its external characteristics, its location in relation to other known objects, or other radar characteristics such as its polarisation properties. In addition, the Synthetic Aperture Radar may be used to provide measurements of earth surface features-to aid navigation.

The means of communication is preferably a direct communications link between the air vehicle and the moving object. The means of communication may comprise a radar beam, which may provide a Radar Information Field, for example. Alternatively the means of communication may comprise a command link, such as a radio frequency signal, for example, for transmitting guidance data to the moving object.

A Radar Information Field allows the determination of positional data, relative to the Radar Information Field, by an object within the Radar Information Field. A Radar Information Field may be realised by the alternate transmission of sum and difference radar beams in opposing planes which are usually but not necessarily orthogonally disposed. A munition or craft fitted with a measuring device within the Radar Information Field may determine its position relative to the Radar Information Field by comparison of field strength measurements of the sum and difference radar beams within one of the Radar Information Field planes. Measurements determined within both planes of a Radar Information Field system enables the generation of two dimensional position data across the beam. Hence a missile other form of munition or craft within a Radar Information Field may be designed to select a position within the Radar Information Field determined by taking electrical field strength measurements from the Radar Information Field. From this it follows that several munitions within a Radar Information Field may achieve a number of desired positions at various points within the Radar Information Field beam.

Preferably both the Radar Information Field and Synthetic Aperture Radar are generated from a single radar aperture, as generation of Radar Information Field and Synthetic Aperture Radar from a common aperture provides the advantage of greatly reducing handover errors. Additionally the Radar information Field and Synthetic Aperture Radar may be calibrated as an integrated entity to further reduce errors between the two sub-systems. The Radar Information Field may be contained within the field of view of the Synthetic Aperture Radar or may alternatively be located wholly or partially outside of the field of view of the Synthetic Aperture Radar. As the target is approached, the Synthetic Aperture Radar transmission may also provide the Radar Information Field, so that one transmission fulfils the requirements of the Synthetic Aperture Radar and the Radar Information Field.

Use of the Radar Information Field is advantageous in that the moving object does not need to be tracked by the air vehicle in order to determine its position, as is necessary when a command link is used. The Radar Information Field allows the moving object to determine its relative position within the Radar Information Field, thereby eliminating the need for a tracking radar. The use of a Radar Information Field in the present invention relies upon knowledge of the angular relationship between the Synthetic Aperture Radar and the Radar Information Field, which may be determined by mathematical modelling or by measurement and subsequent computation.

The present invention provides a means of launch platform navigation together with a means of directing air launched munitions to provide an accurate means of air targeting. Operationally an aircraft fitted with the present invention might navigate using the Synthetic Aperture Radar to a desired launch point. The Synthetic Aperture Radar measures earth surface features and compares these with geodetic data alternatively obtained to allow the aircraft to determine its accurate position and orientation with respect to the surface of-the earth. The aircraft may launch a munition towards a chosen target or direct a munition launched by a separate aircraft. After launch a Radar Information Field beam may be utilised as a means of steering for the munition. The Radar Information Field may be pointed directly at the target. Alternatively the Radar Information Field may be pointed in a direction which is offset from the target, and the munition may be provided with target position offset data to enable the munition to use the Radar Information Field in conjunction with the target position offset data to locate the target.

A number of means of gathering the munition within the beam are possible including launching the munition directly into a Radar Information Field beam tracking the munition using the Synthetic Aperture Radar or other radar equipment such as a tracker radar, steering the Radar Information Field beam onto the munition and subsequently steering the munition onto a desired course.

Launching the missile on a course which takes it into the Radar Information Field beam at some time after launch For targets hidden from direct view, it is possible to launch the missile, and use the means of communication to steer the missile towards its target until this communications link is lost. At this point the missile's internal Inertial Navigation System (if provided) may be used for guidance, or alternatively a seeker such as an electro-optic or radio frequency seeker may be utilised, or if advantageous, the missile may be allowed to continue along its ballistic course. The advantage of using the present invention in combination with a missile's internal inertial navigation system is that it allows a smaller but less accurate inertial navigation system to be used whilst allowing precision targeting of out-of-line-of-sight targets.

Operationally the Synthetic Aperture Radar may be used to navigate an air vehicle and/or determine orientation to a high order of accuracy in comparison to other means. Furthermore Synthetic Aperture Radar is independent equipment which does not depend on external communication to the air vehicle unlike the commonly used GPS resource which may be denied by jamming. The Synthetic Aperture Radar may be used intermittently both to conserve energy and to minimise the risk of detection of the air vehicle by enemy forces. If the Synthetic Aperture Radar is used intermittently then the minimum rate of use should be that rate required to achieve the guidance requirements. Additionally or alternatively the Synthetic Aperture Radar may employ a range of frequencies to minimise detection and jamming. The Synthetic Aperture Radar advantageously provides ground mapping. Preferably the Synthetic Aperture Radar illuminates the area around the target, and the target may then be identified by comparing the processed radar return information with stored information to enable recognition of the target. Thus the location of the target relative to the Synthetic Aperture Radar can be obtained and one of the munition guidance methods described herein may be used to steer the munition towards the target. Where it is not possible to illuminate the target, for example in the case of underground targets, the Synthetic Aperture Radar may instead locate a known terrain feature, such as a hilltop for example, and use this as a reference assuming that the position of the target relative to the known terrain feature has been previously determined.

Advantageously the means of communication may utilise intermittent radio frequency pulses, or an intermittent Radar Information Field, to lessen the chances of the communications link between the air vehicle and the moving object being detected or tampered with. Furthermore, established techniques for reducing the risk of detection by an enemy and for reducing susceptibility to electronic countermeasures may be employed.

According to the present invention in another embodiment thereof there is provided a method for allowing an air vehicle to guide a moving object towards a desired location comprising the steps of using a Synthetic Aperture Radar to determine the position and/or orientation of the air vehicle relative to a desired location, establishing a communications link for allowing the air vehicle to communicate with the moving object, using the communications link to provide information to the moving object and thereby to guide the moving object towards the desired location.

The communications link may comprise a command link, such as a radio frequency signal, for example, for transmitting guidance data to the moving object. In this case the method will comprise the additional step of tracking the moving object to determine its position relative to the air vehicle.

The communications link may alternatively comprise a radar beam, which may provide a Radar Information Field, for example. In this case, no tracking of the moving object is necessary as the Radar Information Field allows the moving object to determine its relative position within the Radar Information Field. Instead, the method will comprise the additional step of determining the angular relationship between the Synthetic Aperture Radar and the Radar Information Field. This may be determined by mathematical modelling or by measurement and subsequent computation.

Methods for collimating or aligning a radar beam (which may provide a Radar Information Field) with a target in a Synthetic Aperture Radar image are described below.

A Synthetic Aperture Radar (SAR) is well suited to producing a fine resolution image of a ground target and its context, in which the positions of objects are characterised by their ranges and Doppler shifts. The Doppler shift is proportional to the platform velocity and to the cosine of the subtended angle between the sightline to the target and the platform velocity vector. Therefore in a typical SAR application such as this where the sightline is at shallow incidence, the gradient vector of the Doppler shift is close to being in the horizontal plane, transverse to the sightline. This causes the range-Doppler image produced by the SAR to approximate to a plan view of the ground, with the positions of objects being revealed by their differing backscatter and shadowing properties.

However, if other radar means such as a Radar Information Field are to be used to guide a missile towards a target, it is necessary to be able to point a beam precisely in the direction of the target. This requires knowledge, directly or indirectly, of the angles of the target relative to the platform carrying the radar. There is thus a requirement to be able to measure the direction corresponding to a particular Doppler shift. Several means for achieving this are described below.

1. The radar forms sum and difference beams as in conventional monopulse. The beam is steered in pitch and yaw so that returns at the target range and Doppler are on the radar boresight, that is they are nulled out in the difference patterns. The pitch and yaw angles through which the beam must be steered to achieve this are then a measure of the direction to the target. Moreover, if the same antenna and the same sum and difference patterns are also used for the Radar Information Field, the beams are inherently collimated. A limitation of this scheme is that the accuracy will be constrained by the signal to noise ratio of the target, which could be low. A variant of the scheme is the use of two (or more) rows of elements to provide a target elevation measurement, as in interferometric SAR.

2. The radar antenna is a phased array, in which there are several elements or subarrays of elements. The space-time covariance matrix of the element or subarray outputs is formed from the received data, as might be carried out for space-time adaptive processing. The covariance matrix is then subjected to fine resolution spatial-temporal spectral analysis, for instance by the minimum variance technique. Ground returns lie along a sharply defined three-dimensional locus in such spectra, so the direction corresponding to a given Doppler shift can be identified. A smoothing effect on noise can be achieved by fitting a curve to the measured locus, taking advantage of all the returns within the resolution of the beam and the range gate.

To express this more precisely, let the output of the ith element of an N element array at pulse repetition interval (PRI) k be $x_i(k)$. (In general this is a complex number.) Then the vector of arrays outputs at PRI (k) can be expressed as $x(k)=(x_1(k)\ x_2(k)\ \ldots\ x_N(k))^T$, where $^T$ represents transposition. A further vector can be formed by concatenation of such vectors for PRIs k to k+M:

$$X(k)=(x^T(k)\ x^T(k+1)\ \ldots\ x^T(k))^T$$

The space-time covariance matrix is the expected value $M=E\{XX^T\}$, which can be estimated by time averaging the product (Ref. 2). The minimum variance spectrum can be formed from an estimate M of the covariance matrix according to Capon's expression (Ref. 3):

$$W(\theta, \psi, f_D) = \frac{1}{s^H(\theta, \psi, f_D)\hat{M}s(\theta, \psi, f_D)}$$

where $s(\theta,\Psi,f_D)$ is the spatial-temporal steering vector and $^H$ represents Hermitian transposition. This expression must be evaluated for a series of directions, defined by angles θ and Ψ, and Doppler shifts defined as $f_D$. The locus of the peaks in the response provides the correspondence between Doppler shift and angle with respect to the array. Note that spectral analysis techniques other than the minimum variance method could alternatively be used to analyse the space-time covariance matrix.

3. The radar antenna is a phased array, in which there are several elements or subarrays of elements. The returns from each element or subarray are Doppler filtered and corrected for platform motion, as for the SAR image. Then the relative phases and amplitudes of the different element or subarray outputs for the Doppler shift corresponding to the target are estimated. These define the "steering vector" (vector of element or subarray amplitudes and phases) required to point a beam in the direction of the target. This technique is robust to calibration errors in the array.

A particular example of this is where the antenna has two ports, both providing similar polar diagrams but with phase centres displaced in the horizontal plane. Both ports will provide outputs giving similar SAR images, but with an azimuth-dependent phase shift between them. If the relative amplitude and phase of the target signal in the two channels is measured, then a signal transmitted via the ports with the same weighting will form a sum beam in that direction. Alternatively, with an additional 180° phase shift between the channels, a difference beam will be formed with its null directed towards the target.

However, further collimation errors can arise where an active phased array radar is used. This is because the radar is used in transmit for Radar Information Field applications and in transmit-receive for Synthetic Aperture Radar applications, so any changes in the beam patterns between transmit and receive are liable to introduce errors, and active phased array radars generally utilise elements having different calibrations for transmit and receive.

To minimise the errors associated with changes in beam patterns between transmit and receive, the use of the same beams for target angular measurement as well as for Radar Information Field are desirable. If the beams are strictly reciprocal (beam shapes identical on transmit and receive) then the angular measurement may be made using monopulse on receive. If they are not, then it is better to make the angular measurement by sequentially selecting the different Radar Information Field transmit beams and using a fixed beam on receive. This means that the angular measurement process is no longer monopulse, since three or more beams are required for the angular measurement in two planes.

The most suitable form of RIF for such an integrated approach is the use of seqential lobing, in which successive transmissions are made through beams that squint off the boresight in several directions (e.g. left, right, up, down). The Radar Information Field receiver measures its position from the ratios of the signals received in the different lobe switching states, the on boresight condition being indicated by equal signals in all states.

It is proposed that the radar be configured to make its angular measurements from the same sequential lobing beams. For simplicity it can be assumed that the radar transmits through each of four beams in cyclic succession, so that the repetition frequency in a given beam is a quarter of the total. On receive the same beam is used for returns in all transmit lobing states. The beam pattern for reception is not critical provided it is unaffected by the transmit lobing state. Signals from each of the lobing states are integrated separately, then they are added together to form a composite Synthetic Aperture Radar image. The relative amplitude of target returns in the different lobing states provide the angular measurements much as in the Radar Information Field receiver. If the integrated received signals from the target in the upper left and right beams are $v_{u1}$ and $v_{u2}$ respectively, and those in the lower left and right beams are $v_{L1}$, and $v_{L2}$, then the target pitch and yaw directions are given approximately by:

$$\hat{\theta} \approx k_{\theta A}\left(\frac{|v_{U1}|^2 + |v_{u2}|^2}{|v_{L1}|^2 + |v_{L2}|^2} - 1\right)$$

and $$\hat{\psi} \approx k_{\psi A}\left(\frac{|v_{L2}|^2 + |v_{u2}|^2}{|v_{L1}|^2 + |v_{u1}|^2} - 1\right)$$

respectively, where $k_{\theta A}$ and $k_{\psi A}$ are scaling constants.

These formulae could probably be refined to provide more linear angular measurements, according to the particular beamshapes used, but this will often be less important than ensuring that there is no bias in the null. The proposed scheme has the merit of low susceptibility to biases since the received signals are multiplexed through common analogue hardware, and can be digitised before they need to be separated into different channels. After digitisation the relative scaling can be preserved with great accuracy.

Some variations are possible to this scheme. Firstly, it would be possible to select the lobing states in something other than a cyclic sequence, for instance in a pseudo-random sequence. In that case either the same number of pulses would need to be devoted to each lobing state or a correction would need to be made for the consequent disparity in amplitude. Note that it is desirable for the transmissions to be closely interleaved over the dwell time to minimise-the sensitivity to low frequency fading.

Secondly it would be possible to use a different number of beams for the angular measurement, three being the minimum for measurement in two planes and two for a single plane.

Thirdly the scheme could be adapted to suit Radar Information Field transmissions through sum and difference patterns rather than through squinted beams. Again the Synthetic Aperture Radar transmissions would be made through the same beam patterns as would be used for the Radar Information Field, preferably closely interleaved over the Synthetic Aperture Radar dwell time. Again a fixed (notionally sum) beam would be used on receive. Because of the coherent nature of the transmissions, returns from the sum transmit state ($v_s$) could be used to demodulate the returns from the difference transmissions ($v_{\theta\ and\ }v_\Psi$) so as to provide the signs of the angular errors as well as the magnitudes. Then $$\hat{\theta} \approx k_{\theta B} R\left\{\frac{v_\theta}{v_s}\right\}$$

and $$\hat{\psi} \approx k_{\psi B} R\left\{\frac{v_\psi}{v_s}\right\}$$

where $k_{\theta B}$ and $k_{\psi B}$ are scaling constants and R{ } represents the real part. Note that a correction to the integrated signals would be needed in this case for the phase difference arising between pulse groups because of the Doppler shift.

Fourthly, if the radar beams are strictly reciprocal, then the sequential lobing process described above can be reversed so that a single (non-critical) beam is used for transmit and three or more beams are used on receive. The receive beams would be those used in transmit for Radar Information Field. This approach has the advantage that the angular measurement would be monopulse, so it would be less affected by target fading.

Finally, improved accuracy can be achieved if the angular measurements are averaged over multiple resolution cells on the ground instead of just one. The averaging can take place both in the range and cross-range directions.

The method for allowing an air vehicle to guide a moving object towards a desired location may comprise the additional step of utilising the moving object's own internal Inertial Navigation System. In this case, the Inertial Navigation System may be used on loss of the communications link, or at a predetermined time or point on the trajectory of the moving object. Alternatively, a seeker may be utilised instead of or as well as the Inertial Navigation System.

The method includes the establishment of a communications link which may comprise the step of providing an intermittent Radar Information Field, or alternatively utilising an intermittent radio frequency command link.

In another embodiment of the present invention, a GPS or other navigational aid is used for navigating the air vehicle to the vicinity of the target, and the Synthetic Aperture Radar is then used to locate the target, the radar returns being compared with stored target and/or terrain data to identify the target, or to identify a terrain feature at a known position with respect to the target. The advantage of using a navigation means other than the Synthetic Aperture Radar is that the Synthetic Aperture Radar might be detected by enemy forces as the air vehicle flies over the enemy terrain.

In another embodiment of the present invention, the moving object may be provided with an on-board seeker to enable it to home onto the target, rather than utilising a command to line of sight guidance approach as described previously.

According to the present invention there is provided a guidance system for allowing an air vehicle to assist in guiding a moving object to a desired location, comprising
  a Synthetic Aperture Radar located on the air vehicle, and
  a seeker located on the moving object,
    wherein the Synthetic Aperture Radar is for illuminating a target area and the seeker is for receiving the return signals from the target area and for utilising these signals to guide the moving object to the desired location.

The present invention further provides a method for allowing an air vehicle to assist in guiding a moving object to a desired location, comprising the steps of
  using a Synthetic Aperture Radar located on the air vehicle to illuminate a target area,
  providing a seeker on the moving object for receiving the return signals from the target area,
  and for processing the received signals and using these processed signals to identify the desired location,
  and for establishing the direction and range of the desired location from the moving object,
  and for guiding the moving object towards the desired location.

The cost of such a seeker can be significantly lower if it operates in semi-active mode, which would involve relying on a separate transmitter, such as a Synthetic Aperture Radar, in the air vehicle. The air vehicle which launched the moving object may provide the transmitter. Alternatively a second air vehicle may provide the transmitter. The seeker advantageously receives the return of the transmitted signals and can generate a near plan-view image of the illuminated area by use of Synthetic Aperture Radar processing techniques. The image generated from the received return signals may then be compared with an image of the target stored in the moving object before launch. It would also be possible to provide an image of the target via a data link after launch instead of storing this information in the moving object. It may be noted that the Doppler shifts of the target and its surrounding area depend not only on motion of the air vehicle that is providing the radar for illuminating the target, but also on the moving object. The motion of the moving object may be estimated by the moving object's on-board instruments, so that the seeker can correct the image. Alternatively the missile may be tracked and information relating to the motion of the missile may be transmitted to the missile The accuracy of a missile engaging a ground target can potentially be improved if it includes a seeker to enable it to home onto the target, rather than relying on command to line of sight guidance approaches such as command links or radar beams which require a line of sight between the air vehicle and the target. The cost of such a seeker can be significantly lower if it operates in semi-active mode, that is relying on a separate transmitter in the launch air vehicle or other source. The seeker must possess the resolution to detect and lock onto the target, or some other feature having a known spatial relationship to the target, which would normally imply a narrow beamwidth and a high carrier frequency. However, if the air vehicle providing the illumination has a component of motion orthogonal to its sightline to the target, a synthetic aperture effect is produced. The effect is that reflections from different objects on the ground have different Doppler shifts according to their resolved components of the illuminating air vehicle motion, therefore according to their cross-range locations. This can be sensed in a missile with a semi-active seeker, even if the missile has no motion of its own transverse to the sightline. The seeker can generate a near plan-view image of the illuminated area by passing its received signals through a Doppler filter bank. This image can be compared with an image of the target passed to the missile before release from the launch air vehicle, or possibly after launch via a data link.

It may be noted that the Doppler shifts of the target and its surrounding area depend not only on motion of the illuminating air vehicle but also of the missile. The latter component of motion can be estimated by the missile from on-board instruments, (or by a tracker radar,) so the seeker can correct the image for that effect.

In order to home onto the target the seeker must be able to measure the sightline direction and range to the target. The semi-active SAR return signals can be processed to provide a range and Doppler shift corresponding to the target. The azimuth direction of the target can be found from the Doppler shift by one of the methods described above, for which it should be understood that the receiving antenna is now that on the missile rather than that on the illuminating air vehicle. An elevation measurement can be extracted by monopulse techniques, as mentioned above, but more accurate vertical control can be provided by the inclusion of an altimeter in the missile.

The present invention provides that the SAR be used for establishing the position and/or orientation of an air vehicle. Determination of the position and orientation of the air vehicle may be achieved as described below.

The image produced by SAR is approximately a two-dimensional ground plan. If several objects are present in the image, and the positions of those objects are known from prior information, the position of the air vehicle can be estimated. For this to be possible the radar must make accurate range and Doppler measurements, and the Doppler measurements must be converted to azimuth angle. The latter task can be achieved by one of the methods described above. Subsequently the SAR image can be scaled in distance units in the downrange and cross range directions so that triangulation can be used to estimate the position of the air vehicle.

For example, if two objects can be identified on the SAR image, the vector linking the two points can be measured in down range/cross range coordinates. If the same two points can be identified on a digital map, the vector linking the points can be derived in map coordinates, hence relative to true north. The transformation necessary to align the two vectors provides a measure of the sightline direction relative to true north. Since the distance is measured by the SAR, the position of the air vehicle is defined.

The yaw attitude of the air vehicle can be estimated as part of the same process, since measurement of the sightline direction relative to the air vehicle is an intermediate stage. Once the sightline direction is known relative to true north, the air vehicle attitude relative to true north can be extracted.

The yaw incidence of the air vehicle can be estimated by exploiting the knowledge that there is zero Doppler shift along a direction orthogonal to the velocity vector. If the beam is steered until the direction giving zero Doppler shift is found, using the returns from any terrain-giving sufficient signal, the yaw direction of the velocity vector can be estimated relative to the air vehicle.

BRIEF DESCRIPTION OF THE DRAWINGS

The present invention will now be described by way of example only and with reference to the accompanying drawings, of which.

DETAILED DISCUSSION OF EMBODIMENTS

Figure 1:
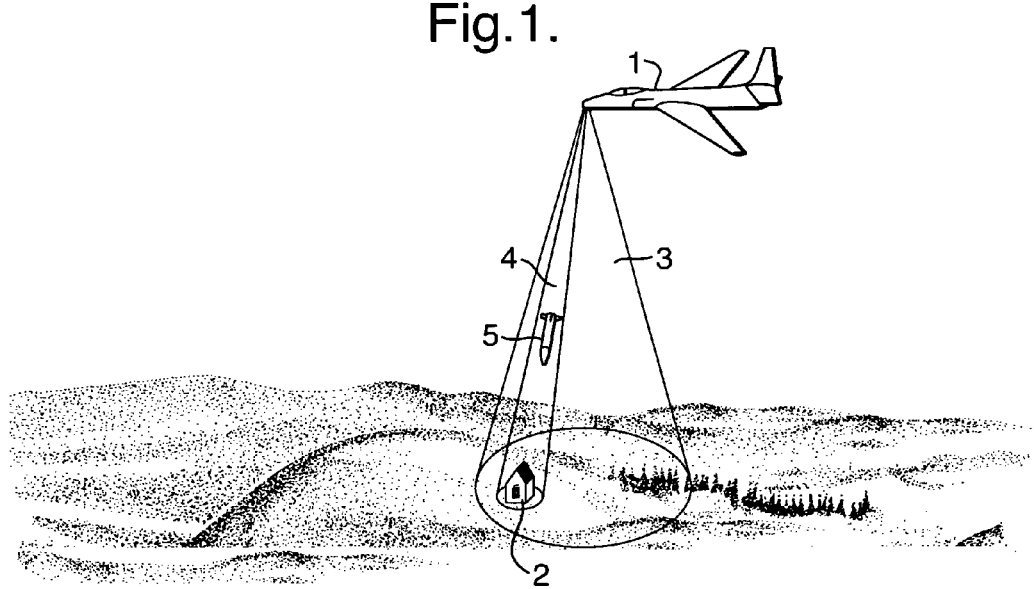
FIG. 1 shows an example of the present invention in use.

FIG. 1 shows an aircraft 1 flying at a distance from target 2. The aircraft 1 is utilising an on-board Synthetic Aperture Radar which has field of view 3. The Synthetic Aperture Radar determines the position and orientation of the aircraft. A single aperture is used to generate the beam for both the Synthetic Aperture Radar and Radar Information Field 4, to minimise alignment errors. The aircraft 1 has released an air-to-surface missile 5 which is guided towards the target 2 by the Radar Information Field 4. The Radar Information Field 4 controls the angular and spatial position of the missile within its beam, steering the missile. The Radar Information Field and/or the Synthetic Aperture Radar may be used intermittently to lessen the risk of detection and/or corruption by electronic countermeasures.

Figure 2:
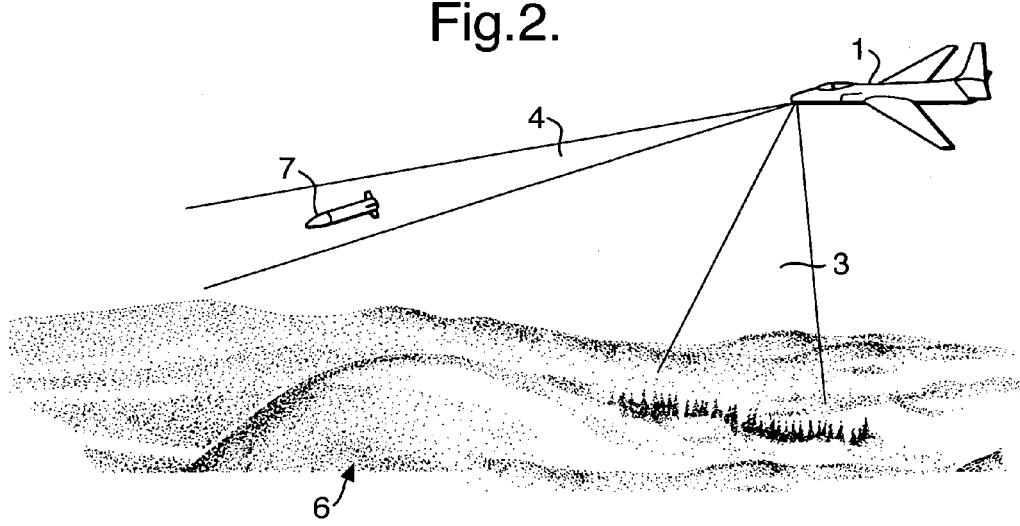
FIG. 2 shows a second example of the present invention in use.

FIG. 2 shows the aircraft 1 flying over terrain 6. The aircraft 1 is utilising an on-board Synthetic Aperture Radar with field of view 3 as described above. This time the Radar Information Field 4 is generated outside of the field of view 3 of the Synthetic Aperture Radar. The Radar Information Field 4 guides an unmanned air vehicle 7 over the terrain 6 at a distance from the aircraft 1. In this case the Radar Information Field is pulsed to save energy and to minimise the risk of detection and/or interference. The pulse rate must meet the guidance update requirements of the unmanned air vehicle so that it is sufficiently accurately guided and does not drift outside of the Radar Information Field beam in between pulses.

Figure 3:
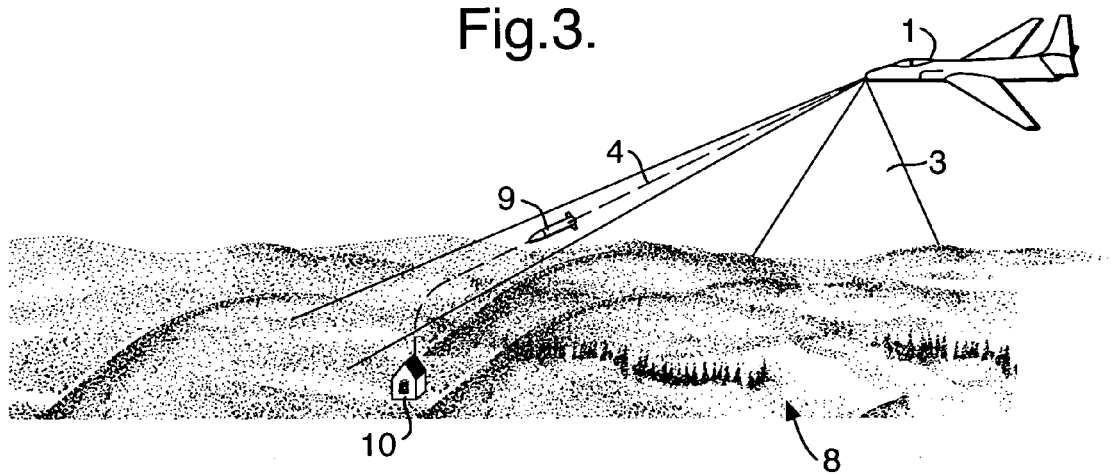
FIG. 3 shows a third example of the present invention in use.

FIG. 3 shows the aircraft 1 flying over terrain 8. The aircraft is utilising an on-board Synthetic Aperture Radar with field of view 3 as described above. The aircraft 1 has released an air-to-surface missile 9 which is initially guided towards the target 10 by the Radar Information Field 4. The aircraft 1 does not have line-of-sight to the target 10 and so the Radar Information Field 4 cannot guide the missile 9 all the way to the target 10. Instead, the Radar Information Field 4 is used to guide the missile 9 as far as possible towards the target 10, and then the missile 9 may rely on its internal inertial navigation equipment or other means such as following a ballistic trajectory to reach the target 10. The dotted line shows the path of the missile 9.

Figure 4:
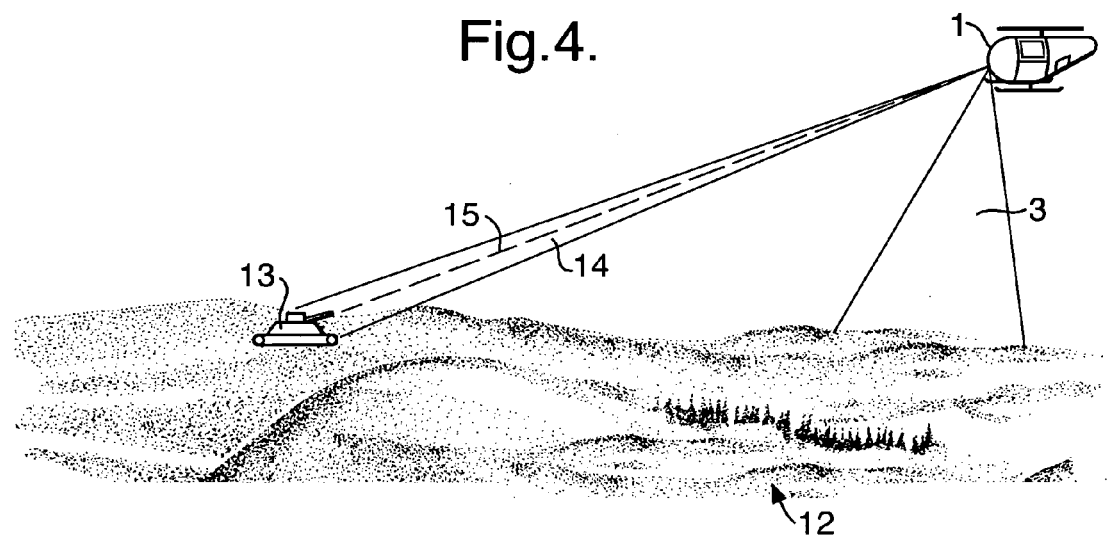
FIG. 4 shows a fourth example of the present invention in use.

FIG. 4 shows a helicopter 11 which is utilising an on-board Synthetic Aperture Radar which has a field of view 3 as described above. The helicopter 11 is flying over terrain 12, and is guiding a tank 13 across the terrain 12. The helicopter 11 is using a multi-function radar to act as both a Synthetic Aperture Radar and a tracking radar, having tracking beam 14, for tracking the tank 13. The tracking radar establishes the position of the tank 13 relative to the helicopter 11. The helicopter 11 communicates with the tank 13 by means of a command link, which allows a radio frequency signal to be transmitted from the helicopter 11 to the tank 13. This signal provides guidance information to the tank, and is denoted by the dotted line 15. Signals other than radio frequency signals could be used instead, for example modulated laser signals.

Figure 5:
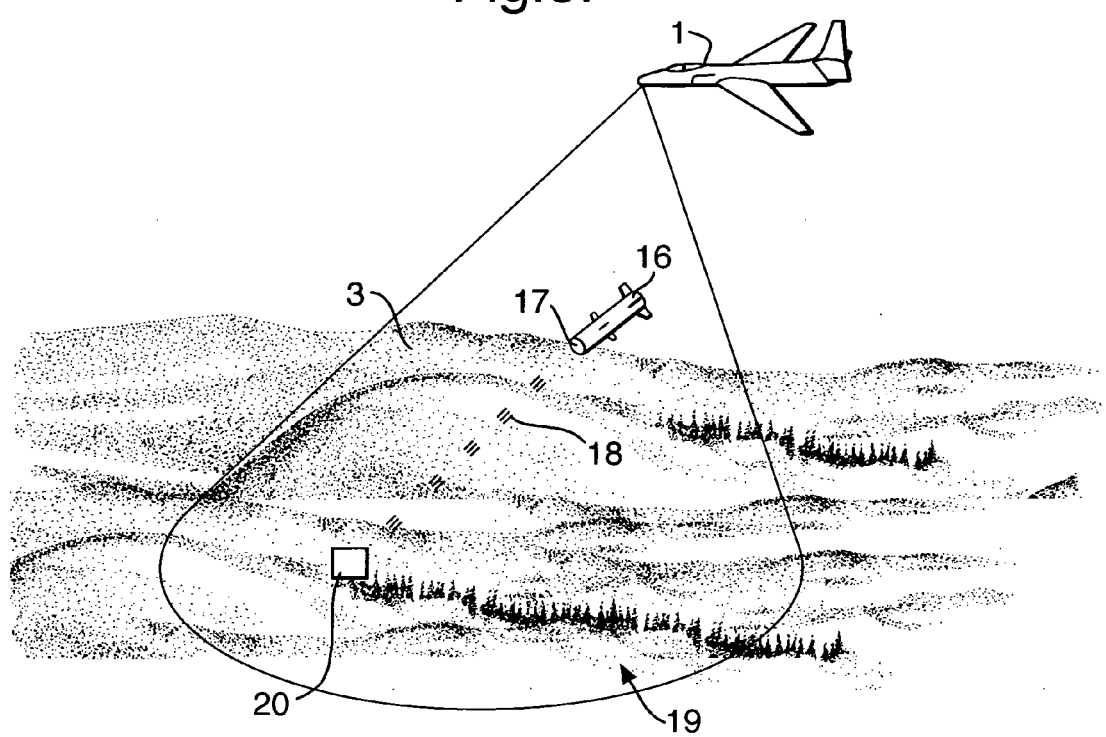
FIG. 5 shows a fifth example of the present invention in use.

FIG. 5 shows an aircraft 1 which is utilising an on-board Synthetic Aperture Radar for locating a target 20. The Synthetic Aperture Radar has a field of view 3 and illuminates the area around the target 20. A missile 16 has been released by the aircraft 1 or by a nearby aircraft, with the objective of hitting the target 20. The seeker 17 of the missile 16 receives the radar returns (denoted by images 18), and the received signal is processed on-board the missile 16 to generate an electromagnetic image of the target 20 and surrounding area 19 for comparison with images of the target and/or surrounding terrain contained within an image library stored within the missile 16. Where target image data is not available, the imagery of a terrain feature located at a known position with respect to the target may be known, and this feature image together with target offset data may be used to guide the missile to the target. Where a direct line of sight to the target is not available, a location visible by line of sight may be illuminated instead and data defining the position of that location with respect to the target should be provided to the missile.

The invention claimed is:

1. A guidance system for allowing an air vehicle to guide a moving object, comprising
a synthetic aperture radar, located on the air vehicle, for determining a position of said air vehicle relative to a desired location;
a steerable radar information field generated by said radar and directed towards said moving object, said moving object located within said radar information field; and
a receiver, located on said moving object, for receiving said radar information field and determining a relative position of said moving object within said radar information field, wherein the moving object maintains a constant position relative to said radar information field and, by said air vehicle steering said radar information field, the moving object is guided towards the desired location.

2. A guidance system as claimed in claim 1 wherein the means of communication comprises a command link for transmitting guidance data to the moving object.

3. A method for allowing an air vehicle to guide a moving object towards a desired location comprising the steps of:
determining the position of the air vehicle relative to a desired location using a synthetic aperture radar located on said air vehicle,
using said radar to generate a steerable radar information field;
directing said radar information field towards said moving object so as to locate said object within said radar information field;
locating a receiver on said moving object for receiving said radar information field and determining a relative position of the moving object within said radar information field;
adjusting the relative position of the moving object within the radar information field by steering the moving object towards a predetermined relative position within the radar information field; and
steering the radar information field towards said desired location while ensuring the moving object remains within said radar information field, thereby guiding the moving object towards the desired location.

4. A method as claimed in claim 3 wherein the synthetic aperture radar is used intermittently.

5. A method as claimed in claim 3 comprising the step of determining the angular relationship between the synthetic aperture radar and the radar information field.

6. A method as claimed in claim 3 wherein the radar information field is provided intermittently.

7. A method as claimed claim 3 wherein the moving object is launched such that its trajectory allows the moving object to encounter the radar information field.

8. A method as claimed in claim 3 further comprising the steps of tracking the moving object, then steering a radar information field onto the moving object and subsequently using the radar information field to steer the moving object towards the desired location.

9. A method as claimed in claim 3 wherein the radar information field is used to guide the moving object along part of its course and an inertial navigation system located on the moving object is used to guide the moving object along another part of its course.

10. A method for aligning a synthetic aperture radar beam with a target in a synthetic aperture radar image, said method comprising the steps of:
    forming sum and difference beams using said radar,
    steering the radar beam in pitch and yaw so that returns at the target range and Doppler shift are on the radar boresight and are therefore nulled out in the difference patterns, and
    calculating the direction of the target using the pitch and yaw angles through which the beam has been steered.

11. A method for aligning a synthetic aperture radar beam with a target in a synthetic aperture radar image, said method comprising the steps of:
    generating the radar beam using a phased array radar antenna having several elements,
    forming a space-time covariance matrix of the elements' outputs from the received return data,
    subjecting the covariance matrix to spatial-temporal spectral analysis, and
    determining the angle of the target with respect to the array using spectral analysis.

12. A method for aligning a radar beam with a target in a Synthetic Aperture Radar image comprising the steps of using a phased array radar for generating a Radar Information Field, the Radar Information Field being generated by at least two different Radar Information Field transmit beams, the different transmit beams each being offset from the radar boresight in different directions, using the same receive beam for receiving target return signals from all the transmit beans, integrating the target return signals from each of the different transmit beams separately, adding together the integrated target return signals to form a composite Synthetic Aperture Radar image, and using the relative amplitudes of the target return signals of the different transmit beams to provide target angular measurement.

* * * * *